US011822637B2

(12) United States Patent
Davis et al.

(10) Patent No.: US 11,822,637 B2
(45) Date of Patent: Nov. 21, 2023

(54) ADAPTIVE AUTHENTICATION IN SPREADSHEET INTERFACE INTEGRATED WITH WEB SERVICE

(71) Applicant: ORACLE INTERNATIONAL CORPORATION, Redwood Shores, CA (US)

(72) Inventors: Edmund A. Davis, Redwood City, CA (US); Shaun Logan, Melrose, MA (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 16/560,201

(22) Filed: Sep. 4, 2019

(65) Prior Publication Data

US 2020/0125713 A1    Apr. 23, 2020

Related U.S. Application Data

(60) Provisional application No. 62/747,500, filed on Oct. 18, 2018.

(51) Int. Cl.
G06F 21/33     (2013.01)
H04L 67/02    (2022.01)
H04L 9/40      (2022.01)
G06F 40/18    (2020.01)

(52) U.S. Cl.
CPC ............ *G06F 21/335* (2013.01); *G06F 40/18* (2020.01); *H04L 63/0807* (2013.01); *H04L 63/205* (2013.01); *H04L 67/02* (2013.01)

(58) Field of Classification Search
None
See application file for complete search history.

(56) References Cited

U.S. PATENT DOCUMENTS

| 5,784,566 A * | 7/1998 | Viavant | G06F 21/31 |
| | | | 709/229 |
| 8,528,071 B1 * | 9/2013 | Kwan | H04L 63/0876 |
| | | | 726/14 |
| 8,763,096 B1 * | 6/2014 | Hernacki | H04L 63/08 |
| | | | 726/5 |
| 9,372,681 B1 * | 6/2016 | Shevchenko | G06F 16/9566 |
| 9,378,386 B1 * | 6/2016 | Saylor | G06F 21/6245 |
| 10,116,648 B1 * | 10/2018 | Sharma | H04W 12/069 |
| 10,313,359 B2 * | 6/2019 | Ruhlen | H04L 63/0807 |

(Continued)

*Primary Examiner* — Michael W Chao
(74) *Attorney, Agent, or Firm* — Trellis IP Law Group, PC

(57) ABSTRACT

An example method facilitates authenticating a client-side program, such as a spreadsheet, for access to and use of protected server-side data and/or functionality provided via a web service, such as a REpresentational State Transfer (REST) service or Application Programming Interface (API). The example method uses an add-in or plugin to the spreadsheet (which may run on a mobile device, desktop computer, other client system) to interrogate, negotiate with, or otherwise test or poll the web service to be accessed, so as to determine an authentication method used by the web service when authenticating clients; and to implement an authentication flow in accordance with the authentication method, thereby facilitating authentication of the spreadsheet for interaction with the web service in accordance with permissions associated with the authenticated client software, i.e., spreadsheet.

27 Claims, 8 Drawing Sheets

(56) References Cited

U.S. PATENT DOCUMENTS

| | | | | |
|---|---|---|---|---|
| 10,878,079 B2* | 12/2020 | Vepa | | G06F 21/34 |
| 11,134,071 B2* | 9/2021 | Kumar | | H04L 63/0807 |
| 11,159,505 B1* | 10/2021 | Lester | | G06F 21/552 |
| 11,206,253 B2* | 12/2021 | Huang | | G06F 21/31 |
| 11,233,786 B2* | 1/2022 | Ma | | H04L 63/107 |
| 11,265,310 B2* | 3/2022 | Kawaguchi | | H04L 63/08 |
| 11,340,961 B2* | 5/2022 | Kesavan | | H04L 67/53 |
| 11,627,121 B2* | 4/2023 | Newberg | | H04L 63/205 |
| | | | | 726/5 |
| 2002/0059144 A1* | 5/2002 | Meffert | | H04L 63/0442 |
| | | | | 705/51 |
| 2004/0128547 A1* | 7/2004 | Laidlaw | | H04L 63/08 |
| | | | | 726/9 |
| 2004/0143730 A1* | 7/2004 | Wen | | H04L 63/0861 |
| | | | | 713/150 |
| 2004/0205473 A1* | 10/2004 | Fisher | | H04L 67/28 |
| | | | | 715/255 |
| 2005/0267947 A1* | 12/2005 | Patrick | | H04L 67/566 |
| | | | | 709/227 |
| 2006/0026671 A1* | 2/2006 | Potter | | H04L 69/24 |
| | | | | 726/7 |
| 2006/0173844 A1* | 8/2006 | Zhang | | H04L 63/083 |
| | | | | 707/999.009 |
| 2006/0218393 A1* | 9/2006 | Hernandez | | H04L 69/18 |
| | | | | 713/167 |
| 2007/0033643 A1* | 2/2007 | Rossi | | H04L 63/205 |
| | | | | 726/10 |
| 2007/0300057 A1* | 12/2007 | Corcoran | | H04L 9/3234 |
| | | | | 713/154 |
| 2008/0031235 A1* | 2/2008 | Harris | | H04L 69/163 |
| | | | | 370/389 |
| 2009/0249440 A1* | 10/2009 | Platt | | H04L 63/20 |
| | | | | 726/1 |
| 2009/0328140 A1* | 12/2009 | McPherson | | H04L 63/205 |
| | | | | 726/2 |
| 2010/0146262 A1* | 6/2010 | Zhang | | H04W 12/068 |
| | | | | 713/155 |
| 2011/0016379 A1* | 1/2011 | McColl | | G06F 40/18 |
| | | | | 715/219 |
| 2012/0011195 A1* | 1/2012 | Prish | | G06F 40/18 |
| | | | | 709/203 |
| 2013/0198733 A1* | 8/2013 | Farrell | | G06F 9/44526 |
| | | | | 717/173 |
| 2014/0136936 A1* | 5/2014 | Patel | | G06F 40/18 |
| | | | | 715/212 |
| 2014/0136937 A1* | 5/2014 | Patel | | G06F 40/18 |
| | | | | 715/212 |
| 2014/0189779 A1* | 7/2014 | Baghdasaryan | | H04L 63/0861 |
| | | | | 726/1 |
| 2014/0281909 A1* | 9/2014 | Pinto | | G06F 16/958 |
| | | | | 715/234 |
| 2014/0289528 A1* | 9/2014 | Baghdasaryan | | H04L 9/3297 |
| | | | | 713/171 |
| 2014/0289833 A1* | 9/2014 | Briceno | | H04L 63/08 |
| | | | | 726/5 |
| 2015/0019624 A1* | 1/2015 | Jayakeerthy | | H04L 67/02 |
| | | | | 709/203 |
| 2015/0188906 A1* | 7/2015 | Minov | | H04L 63/062 |
| | | | | 726/8 |
| 2015/0319174 A1* | 11/2015 | Hayton | | H04L 63/0815 |
| | | | | 726/7 |
| 2016/0014196 A1* | 1/2016 | Azulay | | H04L 63/08 |
| | | | | 726/3 |
| 2016/0087957 A1* | 3/2016 | Shah | | H04L 63/08 |
| | | | | 726/1 |
| 2016/0098254 A1* | 4/2016 | Paternostro | | G06F 9/44589 |
| | | | | 717/105 |
| 2016/0142405 A1* | 5/2016 | Deffeyes | | G06V 40/70 |
| | | | | 726/7 |
| 2016/0277391 A1* | 9/2016 | Choyi | | H04L 63/062 |
| 2016/0381080 A1* | 12/2016 | Reddem | | H04L 63/0884 |
| | | | | 726/1 |
| 2017/0093829 A1* | 3/2017 | Gitlin | | H04L 63/0846 |
| 2017/0171216 A1* | 6/2017 | Chhabra | | H04L 63/08 |
| 2017/0214726 A1* | 7/2017 | Malatesha | | G06F 3/1454 |
| 2017/0237734 A1* | 8/2017 | Hallenborg | | H04L 63/0884 |
| | | | | 726/7 |
| 2017/0374070 A1* | 12/2017 | Shah | | H04L 63/105 |
| 2018/0139606 A1* | 5/2018 | Green | | H04L 63/107 |
| 2019/0149532 A1* | 5/2019 | Newberg | | H04W 12/06 |
| | | | | 726/5 |
| 2019/0207918 A1* | 7/2019 | Kurian | | H04L 63/08 |
| 2019/0222576 A1* | 7/2019 | Borkar | | H04L 63/0861 |
| 2021/0288953 A1* | 9/2021 | Valecha | | H04L 63/102 |
| 2021/0326467 A1* | 10/2021 | Levy | | G06F 21/64 |
| 2022/0006631 A1* | 1/2022 | Konduru | | H04W 12/30 |

* cited by examiner

ADAPTIVE AUTHENTICATION IN SPREADSHEET INTERFACE INTEGRATED WITH WEB SERVICE

CROSS REFERENCES TO RELATED APPLICATIONS

This application claims the benefit of U.S. Provisional Patent Application Ser. No. 62/747,500, entitled ADAPTIVE AUTHENTICATION IN SPREADSHEET INTERFACE INTEGRATED WITH WEB SERVICE, filed on Oct. 18, 2018 (ORACP0245P/ORA190245-US-PSP), which is hereby incorporated by reference as if set forth in full in this application for all purposes.

This application is further related to U.S. patent application Ser. No. 16/145,029 (ORACP0205/ORA180186-US-NP), entitled EDITABLE TABLE IN A SPREADSHEET INTEGRATED WITH A WEB SERVICE), filed on Sep. 27, 2018, which is hereby incorporated by reference as if set forth in full in this application for all purposes.

BACKGROUND

The present application relates to computing, and more specifically to systems and methods for interacting with web services, such as REpresentational State Transfer (REST) web services or Application Programming Interfaces (APIs), via client-side software, and particularly web services that provide authenticated access to protected server-side data.

Systems and methods for authenticating users and associated client-side software before allowing interaction with cloud-based data via one or more web services or APIs, are employed in various demanding applications, including enterprise mobile apps used to access, e.g., create, update, modify, and/or delete cloud-based business data. Such applications often demand efficient user-friendly mechanisms for authenticating users and associated software applications to enable the software applications to interact with cloud-based data via an associated web service.

Business users further demand access to their business data using client-side programs, such as spreadsheets. Conventionally, such applications may lack efficient mechanisms for authenticating with (and otherwise interacting with) web services, which may be needed to access and update the cloud-based data (i.e., data stored in a cloud, representing collection of one or more server systems).

Accordingly, this may necessitate that the user employ a different software program, such as a browser, to login to the cloud; download data from the cloud, and so on. However, this may require a user to manually provide configuration parameters (e.g., identifying the type of authentication to be employed when interacting with the web service, and so on) that govern the authentication method used by the client (add-in). Configuring such parameters can be prohibitively tedious and may require expert user knowledge to properly determine how to authenticate with a particular cloud-based data store and associated web service(s).

Furthermore, in some cases, a user or app developer may not recall how to log in (e.g., what authentication method to use) to access a particular cloud-based data store fronted by a particular REST service. This may further complicate client-side access to the data. In other cases, the authentication method used by a particular web service may be altered during its lifecycle. However, this may cause certain client-side applications that have been hard-coded to use a particular authentication method to no longer function properly.

SUMMARY

An example method facilitates enabling communications between a client-side program and server-side software that services protected data and/or functionality to be accessed by the client-side program. The example method includes receiving a signal from the client-side program to communicate with server-side software (e.g., where an add-in module receives the signal from the client-side program, such as a spreadsheet; wherein the signal corresponds to an event triggered by user interaction with the client-side program, and where the user interaction may include selecting a UI control for accessing cloud-based content and/or functionality, as discussed more fully below); interrogating the server-side software for authentication-method information; using the authentication-method information to authenticate the client-side program for interaction with the server-side software; and enabling communications between the client-side program and the server-side software using an authentication method specified by the authentication-method information.

In a more specific embodiment, the server-side software includes a REpresentational State Transfer (REST) web service, and the client-side program includes a spreadsheet program (also simply called spreadsheet herein). Although reference may be made to specific types of spreadsheet programs, e.g., Microsoft Excel, Google Sheets, Open Office, etc., it should be apparent that features of the embodiments can be adapted for use with any suitable spreadsheet program. The example method may be implemented using an add-in to the spreadsheet. Examples of different authentication methods that a web service may use include basic access authentication (BASIC) and JavaScript Object Notation (JSON) Web Token (JWT) methods.

The specific example method may further include automatically determining an appropriate User Interface (UI) or other mechanism to use to collect authentication information (also called evidence herein) from the user or identity provider. The UI and/or other mechanism for collecting authentication credentials or other authentication information is/are tailored to the specific authentication method that an authentication module of the add-in determines is used by the web service.

Hence, certain embodiments discussed herein provide an adaptive authentication method, which may adapt authentication methods and associated UIs offered to the user (so as to collect credentials, obtain tokens, or other tasks required by the authentication method in use), in accordance with authentication-method information obtained via interaction between the spreadsheet add-in and the web service. This removes a burden on client-side software developers and users to be knowledgeable as to details of authentication methods used by a web service to enable their software to access or used data and/or functionality thereof. Furthermore, it provides flexibility and automatic adaptability to accommodate different authentication methods for web services as needed.

A further understanding of the nature and the advantages of particular embodiments disclosed herein may be realized by reference of the remaining portions of the specification and the attached drawings.

DETAILED DESCRIPTION OF EMBODIMENTS

Figure 1:
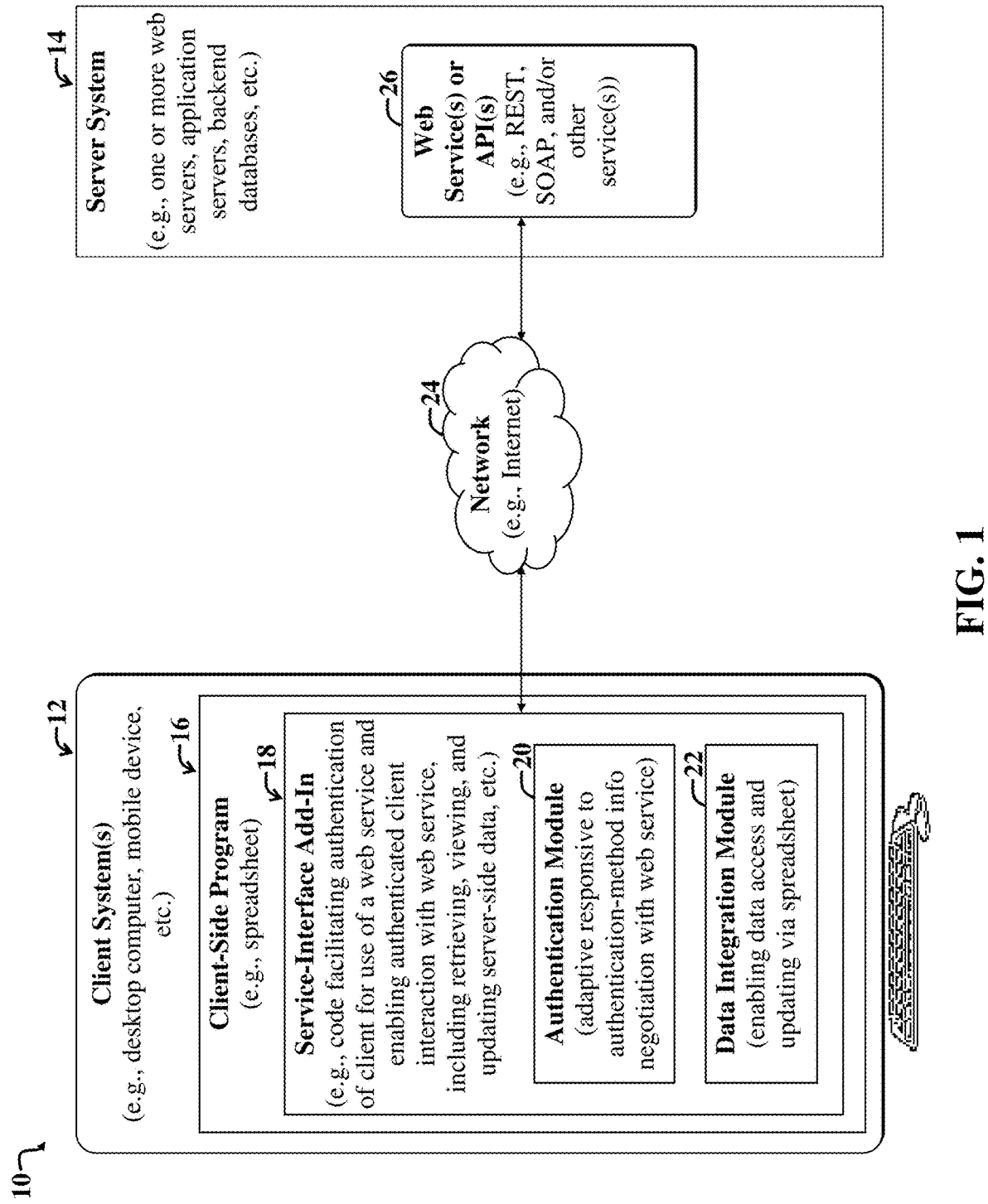
FIG. 1 illustrates a first example system and accompanying computing environment employing a client-side add-in to augment the spreadsheet with functionality for facilitating authenticating the user of the client-side program to enable access to and/or use of protected data and/or functionality of a web service.

Generally, software developers, configuration managers, deployment managers, and other users of a computing environment may subscribe to certain cloud services to facilitate development, configuration, and deployment of software applications and storage of associated files.

For the purposes of the present discussion, a server may be any computing resource, such as a computer and/or software that is adapted to provide content, e.g., data and/or functionality, to another computing resource or entity that requests it, i.e., the client. A client may be any computer or system, including software system that is adapted to receive content from another computer or system, called a server. A server system may be any collection of one or more servers and accompanying computing resources. The terms "client device" and "client" may be employed interchangeably herein, however, depending upon the context in which the term is used, the term client may refer more generally to both client devices and client software.

A computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Embodiments discussed herein generally related to systems and methods for using software (called client-side software herein) running on a desktop computer, mobile device, or other computer system to authenticate with and access data, update, or otherwise use any functionality provided by web services, e.g., REpresentational State Transfer (REST) services or Application Programming Interfaces (APIs)

Methods for facilitating interaction and communication between client-side software, such as spreadsheets, and server-side software, such as web services, are employed in various demanding applications, including enterprise applications where enterprise personnel must first authenticate before accessing, manipulating, or otherwise updating cloud-based business data.

However, for users of client-side programs, authenticating, viewing, editing, and updating cloud-based data (e.g., data stored in a backend database of a server system and accessible via one or more web services or APIs) can be relatively cumbersome.

Note that cloud-based data is often protected by security policies that require authentication before the data can be accessed or modified. Conventionally, a user or developer manually provides configuration parameters (identifying the type of authentication to be employed when interacting with the web service, and so on) that govern the authentication method to be used by the client-side software.

Furthermore, the requisite authentication configuration settings (e.g., specifying which authentication method to use) for client-side software can change between the development phase and the production phase. Certain embodiments discussed herein provide mechanisms for automatically adapting client-side software authentication methods in accordance with the sensed authentication method of a web service.

For clarity, certain well-known components, such as hard drives, processors, power supplies, routers, Internet Service Providers (ISPs), workflow orchestrators, process schedulers, identity management clouds, process clouds, certificate authorities, business process management systems, databases, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a service-interface add-in 18 (also called a client-side add-in or plugin herein) to a client-side program 16, for example, a spreadsheet program (also simply called spreadsheet herein) to augment the program 16 with functionality for facilitating authenticating the user of the client-side program 16 to enable access to and/or use of protected data and/or functionality of a web service or API 26 in accordance with permissions associated with the authenticated user. The web service or API 26 is hosted on a server system 14 that is accessible to the one or more client systems 12 via a network 24, such as the Internet.

Note that when a user supplies valid credentials for a particular authentication method used by the web service or API 26, the user is then authenticated using the credentials. The accompanying client-side program 16 is also said to be authenticated for access to data and/or functionality of the web service or API 26. Note that in certain implementations, the client-side program 16 (e.g., spreadsheet) may only have access to data and/or functionality of the web service or API 26 that are associated with permissions granted to the authenticated user. A phrase "access to data and/or functionality," as used herein can include ability to download and view data from a database that is fronted by the web service or API 26; upload data to the database, and/or modify data in the database, and so on, depending upon permissions linked to authenticated user, e.g., linked via the associated user role or identity.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

In the present example embodiment, the client-side program 16 is or includes a spreadsheet, which has been augmented with the add-in 18. The service-interface add-in 18 includes an authentication module 20, which includes code facilitating adaptive authentication of the client-side program 16 for access to data and/or functionality of the web service or API 26. A data integration module 22 provides functionality for enabling the client-side program 16 to retrieve data from the web service or API 26 (where the data may be maintained in a database that is fronted by the web service or API 26); manipulate the data using the client-side program 16, upload new data, and so on, depending on predetermined permissions associated with the authenticated identity.

In summary, business users may want to access and edit their business data using spreadsheets to integrate with web services or API 26, e.g., REST services. The add-in 18 discussed herein facilitates automatically determining which authentication mechanism is in use by the web service or API 26 to prevent unauthorized access to data and/or functionality provided by the web service.

Embodiments discussed herein may be readily implemented as an add-in 18 or plugin that communicates with a web service to obtain web service metadata (e.g., data describing the web service or features or other aspects thereof or used thereby). The web service(s) or API(s) 26 may support different authentication mechanisms, such as BASIC, JSON Web Token (JWT) and others, to protect against unauthorized access.

In the present example embodiment, the add-in 18 interrogates the web service or API 26 to determine which type of authentication mechanism is in use and then adapts its behavior accordingly to allow authorized users to interact with the web service or API 26. In other words, the authentication module 20 interrogates the web service or API 26 for the presence of common authentication schemes, and then adapts to select the operative authentication method or mechanism. Once selected, the UI for providing authentication credentials or other evidence can be tailored to the operative method or mechanism.

This obviates the need to manually provide configuration parameters that govern the authentication method or approach taken by the service-interface add-in 18. Instead, the add-in 18 automatically adapts to determine and select the operative mechanism.

Figure 2:
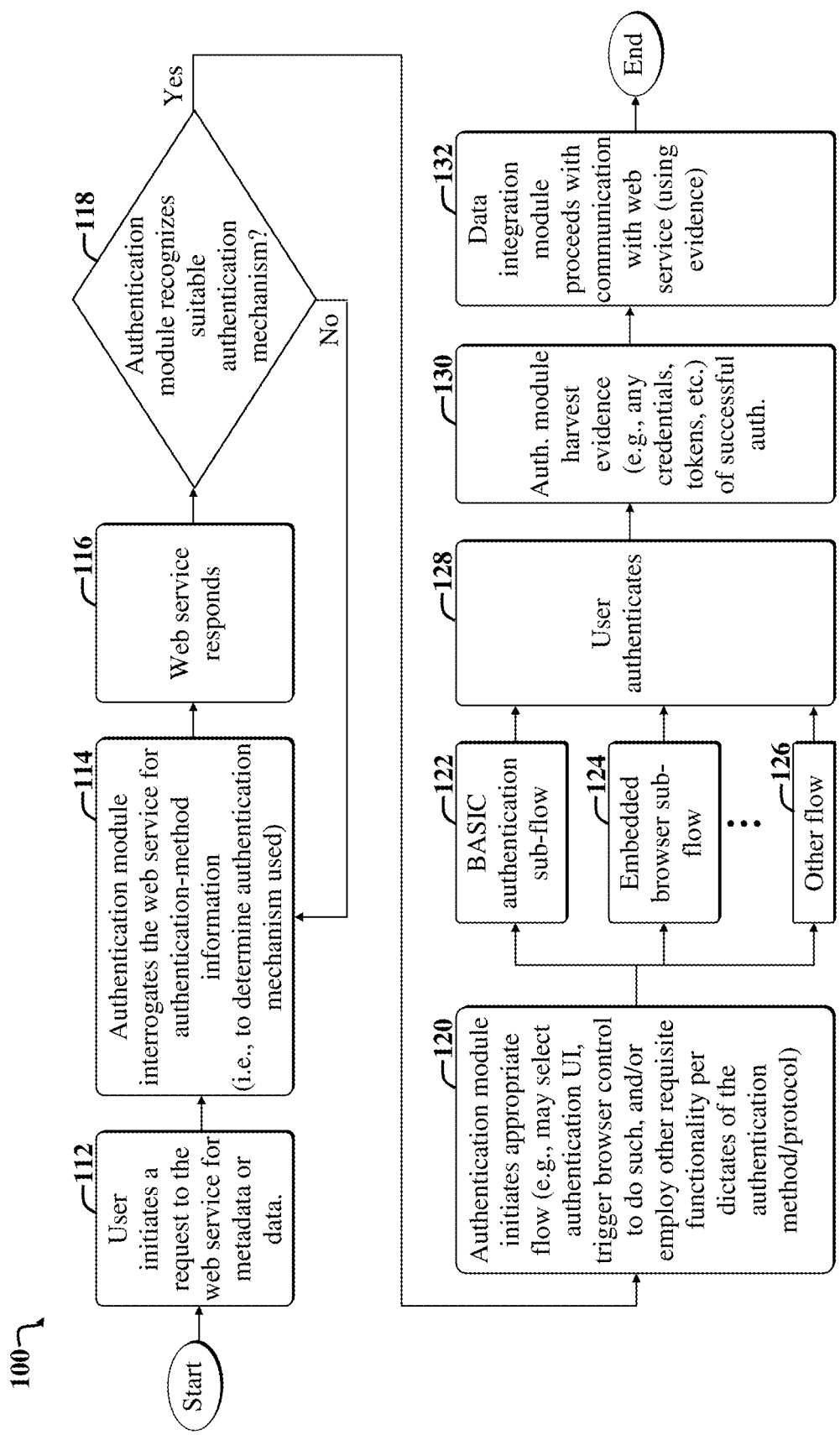
FIG. 2 is a flow diagram of a first example method that is suitable for use with the system of FIG. 1 and incorporates a flow for interrogating the web service of FIG. 1 to obtain authentication-method information, and a flow for authenticating the user based on the obtained authentication-method information.

FIG. 2 is a flow diagram of an example method 100 that is suitable for use with the system 10 of FIG. 1 and incorporates a flow (steps 112-118) for interrogating or negotiating with the web service or API 26 of FIG. 1 to obtain authentication-method information from the web service or API 26, and a flow (steps 120-132) for authenticating the user based on the obtained authentication-method information.

With reference to FIGS. 1 and 2, at an initiation step 112, a user employs the client-side program 16 of FIG. 1 to initiate a request to the web service or API 26 for data (e.g., to be used in a spreadsheet) or metadata (e.g., data describing data, e.g., describing authentication methods used by the web service or API 26, etc.).

Next, in an interrogation step 114, the authentication module 20 of FIG. 1 interrogates (e.g., sends a request message) to the web service or API 26 to inquire about the authentication method or protocol used by the web service or API 26 to authenticate users and associated client-side software (e.g., the client-side program 16 of FIG. 1).

Next, at a response-sending step 116, the web service or API 26 of FIG. 1 responds to the interrogation, such as by providing authentication-method information describing or otherwise implying or indicating the type of authentication method employed by the web service or API 26 of FIG. 1.

A subsequent metadata-checking step 118 checks if the returned metadata, i.e., data describing the authentication method, is sufficient for the authentication module 20 of FIG. 1 to determine the appropriate authentication method to use and that the authentication module 20 can successfully facilitate implementing the specified type of authentication, i.e., that the specified type of authentication corresponds to one of the subsequent sub-flows 122-126.

If in the metadata-checking step 118, the authentication module 20 of FIG. 1 recognizes the web service or API 26 as using a suitable authentication method (i.e., a method that can be handled by the authentication module 20), then a sub-flow initiation step 120 begins. If the response is not suitable, i.e., the authentication module 20 does not recognize the web service or API 26 as using a suitable authentication method, then the authentication module 20 continues its attempts to inquire as to the authentication method used by the web service or API 26. Repeated attempts to query or interrogate the web service or API 26 for authentication-method information may involve use of different types of request messages and may be governed by logic incorporated in the interrogation step 114. The logic may specify which tests to run (e.g., specific request messages to send) if a given test does not return suitable authentication-method information for the web service 26 of FIG. 1; when to terminate a particular test or negotiation (e.g., after all tests are exhausted); and so on.

The sub-flow initiation step 120 involves selecting an appropriate authentication flow (from among the sub-flows 122-126), as determined by the authentication module 20 of FIG. 1 based on one or more responses returned from the web service or API 26, responsive to one or more interrogations by the authentication module 20 seeking to determine the type of authentication method is employed by the web service or API 26 to protect data and functionality that the web service or API 26 provides access to.

Examples of possible authentication flows include a BASIC authentication sub-flow 122, which is used when web service or API 26 employs BASIC authentication; an embedded browser sub-flow 124, e.g., which may be used when the web service or API 26 employs JSON Web Token (JWT) authentication methods (where such methods may leverage services of an identity provider that can be accessed via a browser dialog that is activated by the add-in 18 of FIG. 1 via an embedded browser control, which in turn activates a browser to display the dialog and to thereby provide the UI in which a user can enter credentials), and one or more other sub-flows 126 for different types of authentication. Examples of additional sub-flows that may be available in some embodiments include multifactor authentication, Open AUTHorization (OAUTH), and "federated" authentication sub-flows. Also note that the potential authentication sub-flows could conceivably be extended to include biometric authentication, including but not limited to fingerprint, retinal, and facial scanning and recognition. Furthermore, in some implementations, the add-in 18 of FIG. 1 may rely upon a local (e.g., client-side) operating system to authenticate the user with the remote system (e.g., the web services or APIS 26 of FIG. 1) when those two have a trusted relationship. This method is noteworthy in that no end-user interaction is required (i.e., no additional authentication user interface) at the time the add-in is used, since the user (and associated client-side program 16 of FIG. 1) has already been authenticated with the local operating system.

After the appropriate authentication process, i.e., after one of the sub-flows 122-126 completes, the user (and associated client-side program 16 of FIG. 1) authenticates and provides credentials (or a valid and usable access token is otherwise obtained by the authentication module 20) at step 128.

Next, an evidence-harvesting step 130 involves the authentication module 20 of FIG. 1 harvesting, i.e., gathering or collecting authentication evidence. The authentication evidence (i.e., evidence of successful authentication) can include one or more valid credentials, tokens, cookies, and so on, depending upon the authentication sub-flow 122-126 implemented.

The evidence can be securely cached in the local client system 12 of FIG. 1 to enable the client-side program (spreadsheet) 16 to access the web service or API 26 as needed during a given communication session, without requiring a user to re-enter credentials whenever they wish to use the spreadsheet to interact with server-data (also called cloud-based data herein) and functionality provided via the web service or API 26.

A data integration step 132 involves the data integration module 22 of FIG. 1 proceeding with facilitating communications between the client-side program 16 and web service or API 26 of FIG. 1.

Note that the method 100 of FIG. 2 is illustrative and may be modified or replaced with a different method, without departing from the scope of the present teachings. For example, a more generalized method for facilitating communications between a client-side program and server-side software includes: receiving a signal from the client-side program to communicate with server-side software; interrogating the server-side software for authentication-method information; using the authentication-method information to authenticate the client-side program for interaction with the server-side software; and enabling communications between the client-side program and the server-side software using an authentication method specified by the authentication-method information. Note that with respect to "receiving a signal," a user performs a gesture that initiates (via a signal generated in response to the gesture) a process in an add-in that requires interaction with the web service. At that point, the add-in may or may not have previously authenticated with the web service. If not, then and authentication flow begins, as discussed more fully below with reference to FIG. 2.

The server-side software may include a REST web service that provides a service whereby authenticated client software can access cloud-based data, i.e., can post data to the database, download data from, update data in, delete data in the database, and so on, depending upon permissions associated with the authenticated client.

The spreadsheet may be a program, such as Microsoft Excel®, or other spreadsheet. Another step in the method 100 may include selecting among predetermined UIs that are suitable for each authentication sub-flow 122-126, and using the appropriate UI for a given authentication method to collect sufficient authentication information to enable the client-side program 16 to authenticate with the web service or API 26 of FIG. 1.

Furthermore, note that if the web service or API 26 of FIG. 1 does not provide sufficient detail for the authentication module 20 to determine which authentication sub-flow 122-126 of FIG. 2 to use; then the authentication module 20 may implement additional tests, such as by sending specifically tailored test messages to the web service or API 26; and then analyzing the web service responses.

In summary, the example method 100 represents an adaptive authentication flow and UI flow (e.g., wherein different UIs for facilitating client authentication may be provided depending upon the authentication sub-flow 122-126 used).

Depending on the authentication mechanism identified (e.g., in FIG. 2, block 120), the authentication module 20 of FIG. 1 may initiate a user interface (to implement one of the sub-flows 122-126) appropriate for the mechanism. Once the user has established his/her identity, i.e., has been authenticated, then the authentication module 20 of FIG. 1 harvests the necessary authentication evidence and provides it to the data integration module 22 so that the module 22 and accompanying client side program 16 can proceed to communicate with the web service or API 26 (e.g., including retrieving metadata or data; sending edited data back; and so on).

Figure 3:
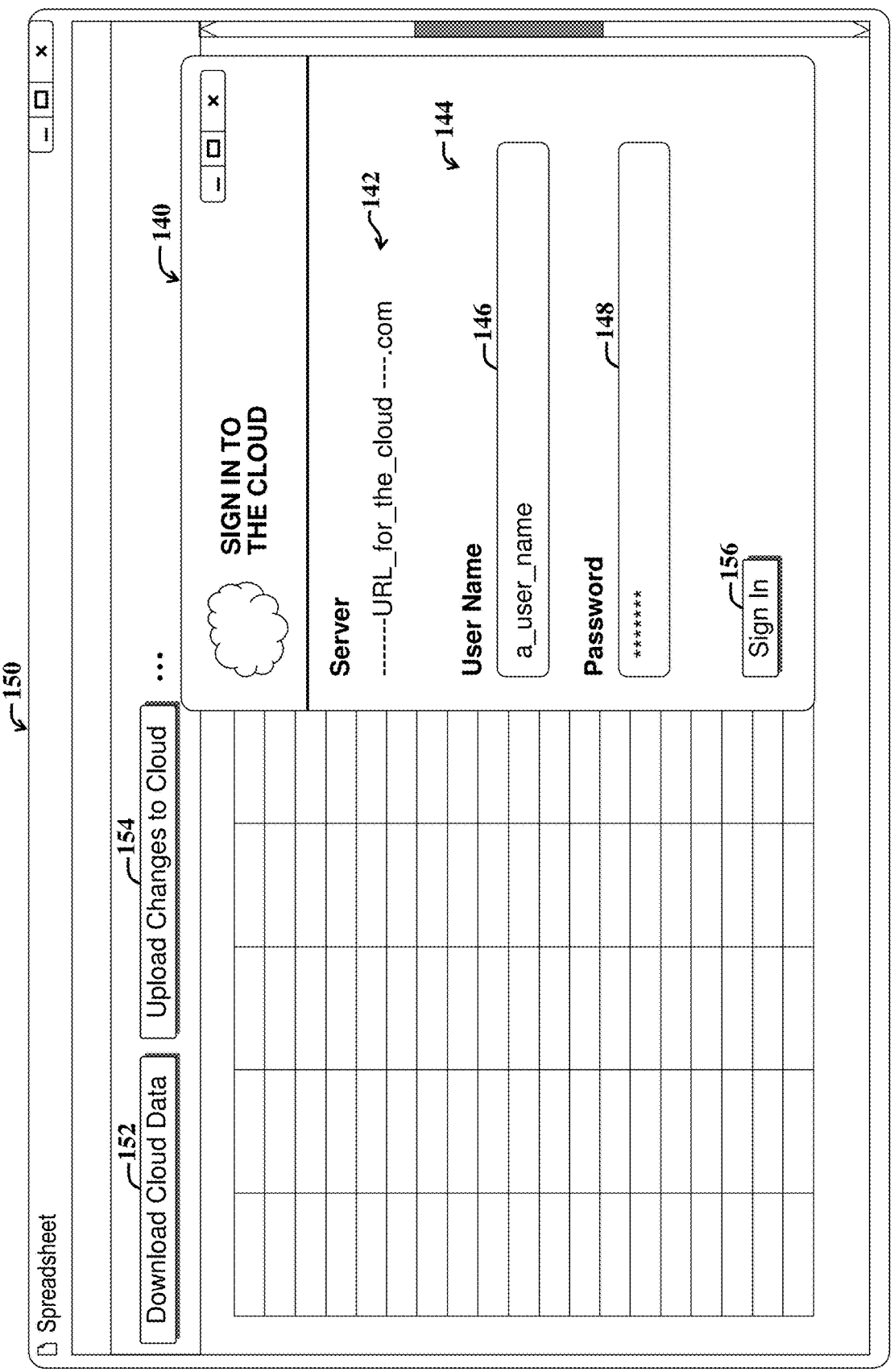
FIG. 3 illustrates an example User Interface (UI) display screen that may be automatically activated via the embodiments of FIGS. 1-2 in response to automatic detection of an authentication method used by a server from which a spreadsheet is used to extract data therefrom.

FIG. 3 illustrates an example User Interface (UI) display screen 140 (implemented as a dialog box) that may be automatically activated via the embodiments of FIGS. 1-2 in response to automatic detection of an authentication method (e.g., by the authentication module 20 of FIG. 1) used by a server (e.g., of the server system 14 of FIG. 1) from which a spreadsheet (e.g., the client-side program 16 of FIG. 1) is used to access or interact with data therefrom (e.g., create, read, update, delete, etc. as permitted by permissions associated with authentication credentials.)

For the purposes of the present discussion, a UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

In the present example embodiment, a user has selected one or more UI controls 152, 154 of an example spreadsheet UI display screen 150. The example UI controls/152, 154 include a download button 152 for initiating a download of cloud-based data for use in the spreadsheet UI display screen 150. User selection of an upload button 154 activates functionality for facilitating uploading data or changed data to the cloud (e.g., corresponding to the server system 14 of FIG. 1).

However, in the present example scenario, the client-side program 16 of FIG. 1, which displays the example spreadsheet UI display screen 150 of FIG. 3, has not yet been authenticated for use of the web service(s) or API(s) 26 of FIG. 1 to access (and/or otherwise interact with) cloud-based data that is fronted by the web service(s) or API(s) 26 of FIG. 1.

Accordingly, the underlying authentication module 20 of FIG. 1 detects that the client-side program 16 requires authentication, and then automatically launches the process flow 100 of FIG. 2, to communicate with the web service(s) or API(s) 26 of FIG. 1 to determine details as to the type of authentication method used; parameters required, and so on, as needed to authenticate the client-side program 16 of FIG. 1 (and associated UI display screen 150 of FIG. 3) to interact with the cloud-based data via the associated web service(s) or API(s) 26 of FIG. 1.

In the present example scenario, the BASIC authentication sub-flow 122 of FIG. 2 is activated, thereby automatically causing display of the example dialog box (also simply called dialog herein) 140 used to collect authentication credentials (also called login credentials) 144, including a user name 146 and password 148, as needed to authenticate with an identified server 142 using the BASIC authentication mechanism or method.

After a user enters the login credentials 144 and then selects a sign-in control 156, the collected credentials are sent to the web service(s) or API(s) 26 of FIG. 1, which then verifies the credentials, and authenticates the client-side program 16 of FIG. 1 to enable use of the web service(s) or API(s) 26 to interact with server-side data (also called cloud-based data herein) and functionality.

Note that upon verification of valid authentication credentials 144, the user has successfully authenticated. However, the client-side program 16 of FIG. 1 is also said to be authenticated for access to and use of the web service(s) or API(s) 26 of FIG. 1, to the extent that the client-side program 16 may now interact and use the web service(s) or API(s) 26 in accordance with permissions associated with the supplied login credentials 144 by the web service(s) or API(s) 26 of FIG. 1.

Note that in other embodiments, the login credentials 144 may be sent to a separate identity provider or identity management system, which may issue one or more tokens that are usable to access data and functionality available via the web service(s) or API(s) 26 of FIG. 1. Details as to where the information is to be sent, what communication protocol should be used, and so on, may be automatically determined by the authentication module 20 of FIG. 1 via communications with (including interrogations of) the web service(s) or API(s) of FIG. 1.

Accordingly, various embodiments discussed herein incorporate functionality for adaptively determining, on the fly, which authentication method (including authentication method type, needed parameters, protocol details, and so on) is used by a particular web service with which the spreadsheet will communicate; then proceeds to gather authentication credentials in accordance with the detected authentication method. This may or may not require the launching of a dialog box. For instance, in some embodiments, biometric, Single Sign-On (SSO), OAuth, and federated access authentication mechanisms may help to obviate the need for the authentication module 20 of FIG. 1 to launch a dialog, such as the dialog box 140 of FIG. 3.

This may occur, for instance, if the web service(s) or API(s) 26 of FIG. 1 employs an authentication method that can automatically authenticate the client-side program 16 of FIG. 1 based on other data that need not be collected via a dialog box. In some embodiments or scenarios, this may involve use of a bearer token and client ID to automatically obtain an access token to gain access to data and/or functionality of the web service(s) or API(s) 26 of FIG. 1.

In another example scenario, the detected authentication method may specify use of a particular identity management system. The underlying authentication module 20 of FIG. 1 may then cause the launching of an embedded browser control (e.g., pop-up window) showing a page hosted by the appropriate identity management system and usable to capture authentication credentials from the user. The identity management system may then capture the credentials; verify validity; and then subsequently allow communications and interactions between the service-interface add-in 18 of FIG. 1 and the web service(s) or API(s) 26 of FIG. 1.

Accordingly, the client-side program 16 having the add-in 18 of FIG. 1 includes code for detecting client requests (e.g., via one or more of the UI controls 152, 154 of FIG. 3) for cloud-based data access; then interrogating a REST service (e.g., corresponding the web services or APIs 26 of FIG. 1) to determine which type of authentication method is used by the REST service (where the REST service provides access to the cloud-based data). The REST-service authentication method may be implicit in metadata obtained from the REST service (in response to the interrogating), or as otherwise inferred from additional interrogations and responsive REST service replies.

Using embodiments as discussed herein, a client-side spreadsheet can now (as opposed to previously) readily authenticate and then synchronize and integrate their locally stored data with cloud-based data via a spreadsheet plugin that communicates with a REST service that facilitates authenticated client-side access to the cloud-based data. The spreadsheet plugin further facilitates user authentication with the REST service (or other type of service or API), e.g., by automatically determining an authentication mechanism employed by a REST service and launching an appropriate flow. By automating authentication and integration between client-side spreadsheets and cloud-based software and data, users can now readily use their client-side spreadsheets to access and update both cloud-based data and locally stored data.

Client-side spreadsheets are often used to manipulate, update, and generate analytics using locally stored data. However, as businesses migrate their data to the cloud, use of conventional spreadsheets may require, for instance, that users employ a separate program (e.g., browser) to login to their cloud account (i.e., authenticate); download data from the cloud; open the spreadsheet application to access/use the downloaded data; and then return to the separate program (e.g., browser) to upload any updated data to the cloud. However, conventionally, this process can be tedious and error prone.

Certain embodiments discussed herein may selectively combine functionality for facilitating user authentication (i.e., authentication with a REST service used to retrieve data for use by a client-side spreadsheet) with functionality for facilitating determination of the associated REST service authentication method. Additional functionality facilitates retrieval, automatic or otherwise, of credentials needed to authenticate with the REST service and associated server in accordance with the authentication method.

In summary, with reference to FIG. 1, the service-interface add-in (e.g., add-in 18 of FIG. 1) to preexisting spreadsheet applications implements functionality (e.g., via modules 20, 22 of FIG. 1) for facilitating user authentication and automatic data integration between client-side spreadsheet data and server-side data stored in the cloud. This mitigates conventional tedious error-prone processes described above.

Figure 4:
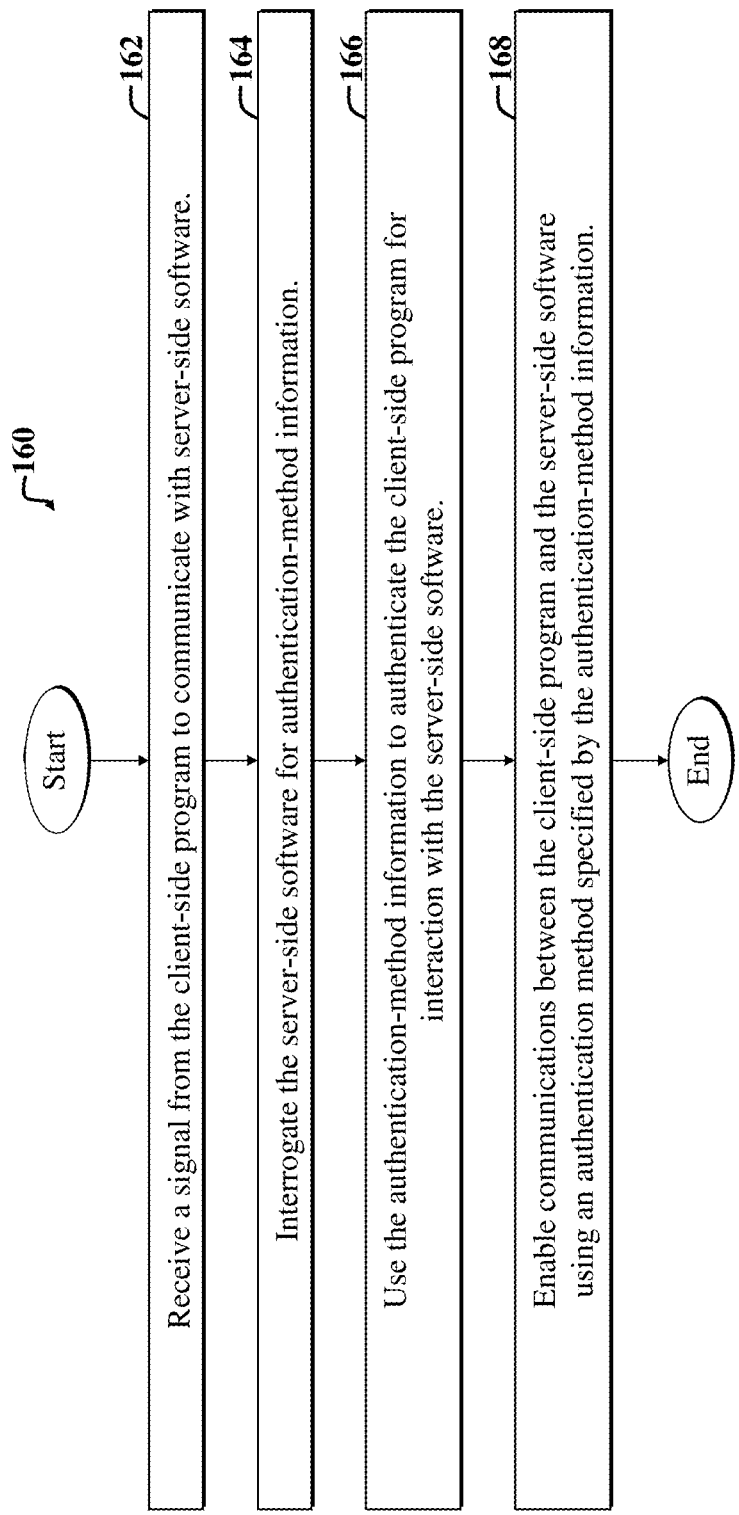
FIG. 4 is flow diagram of a second example method that is suitable for use with the embodiments of FIGS. 1-3.

FIG. 4 is flow diagram of a second example method 160 suitable for use with the embodiments of FIGS. 1-3. The second example method 160 facilitates communications between a client-side program and server-side software.

The second example method 160 includes a first signal-receiving step 162, which involves receiving a signal from the client-side program (e.g., the client-side program 16 of FIG. 1) to communicate with server-side software (e.g., including the web services or APIs 26 of FIG. 1). For example, the spreadsheet (e.g., client-side program 16 of FIG. 1) may receive the signal in response to user selection of the example download button 152 or upload button 154 of FIG. 3.

Next, an interrogating step 164 includes interrogating the server-side software for authentication-method information. The interrogation may involve, for example, sending request messages for metadata (describing the authentication method and/or mechanism used) from the web services or APIs 26 of FIG. 1.

The interrogation may also involve implementing tests on the web services or APIs 26 of FIG. 1, e.g., when the retrieved metadata is insufficient to identify the authentication method and associated parameters and descriptors needed to automatically implement the authentication method (e.g., obtain requisite credentials, etc.). The testing may involve the sending of messages (and analyzing the responses) to test which type of authentication method (and/or properties or parameters thereof) are employed by the web services or APIs 26 of FIG. 1.

A subsequent metadata-using step 166 includes using the authentication-method information to authenticate the client-side program for interaction with the server-side software.

Next, a communications-enabling step 168 includes enabling communications between the client-side program (e.g., the client-side program 16 of FIG. 1) and the server-side software using an authentication method specified by the authentication-method information.

Note that the second example method 160 may be modified, without departing from the scope of the present teachings. For example, certain steps may be added, interchanged, omitted, replaced with other steps, or additional detail may be specified, without departing from the scope of the present teachings.

For example, the second example method 160 may further specify that the server-side software includes a REST web service and that the client-side program includes a spreadsheet program, such as Microsoft Excel®.

The second example method 160 may further include using an add-in to the client-side program to implement steps 162-168 of the method 160. Furthermore, in certain instances, the method 160 ma further specify that the authentication method includes use of a JSON Web Token (JWT), or that the authentication method includes BASIC (basic access authentication), and so on.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A UI display screen contained within a single border may be called a view, window. Views or windows may include sections, such as sub-views or sub-windows, dialog boxes, graphs, tables, and so on. In certain cases, a user interface display screen may refer to all application windows presently displayed on a display.

The second example method 160 may further include selecting and activating a UI display screen (e.g., the UI display screen 140 of FIG. 3), based on the authentication method (and associated characteristics). The activated UI display screen includes one or more UI controls (e.g., fields of username 146 and password 148, and sign-in button 156 of FIG. 3) for obtaining or harvesting authentication credentials. The UI display screen may be tailored to the authentication method and may automatically be varied to accommodate different or changing authentication methods used by the web services (e.g., the web services or APIs 26 of FIG. 1).

The second example method 160 may further include using the UI display screen to collect one or more authentication credentials (e.g., username and password) from a user; and then employing the credentials to facilitate authenticating the user and client-side program for access to cloud-based data via the server-side software.

Figure 5:
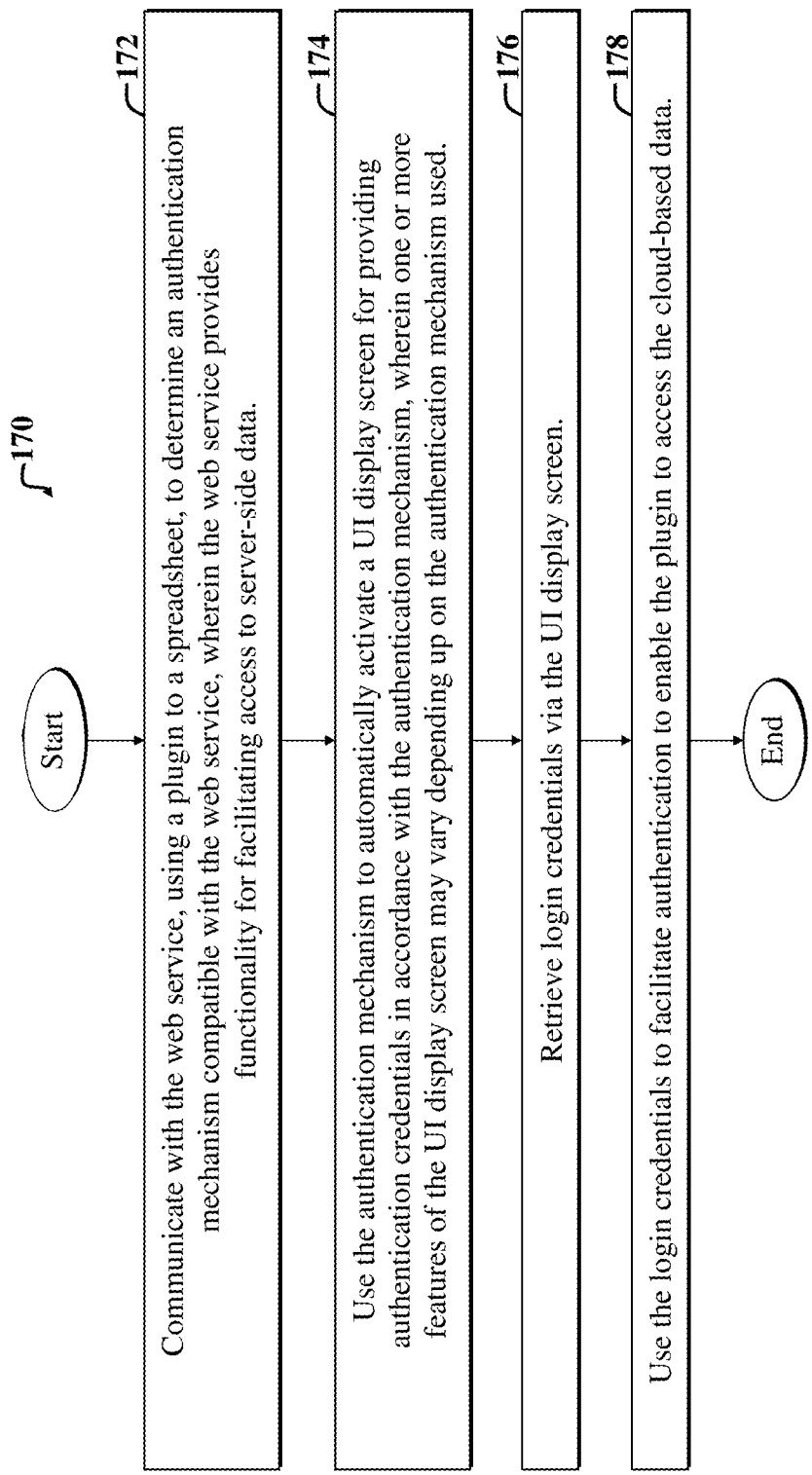
FIG. 5 is a flow diagram of a third example method that is suitable for use with the embodiments of FIGS. 1-4.

FIG. 5 is a flow diagram of a third example method 170 that is suitable for use with the embodiments of FIGS. 1-4. The third example method 170 facilitates use of a spreadsheet to authenticate with a web service to enable spreadsheet access to cloud-based data via the web service (that requires authentication before access to data and/or functionality governed thereby is granted for use by a particular client-side program).

The third example method 170 includes an initial communicating step 172, which includes communicating with (e.g., interrogating) the web service (e.g., corresponding to the web services or APIs 26 of FIG. 1), using a plugin to a spreadsheet (e.g., corresponding to the service-interface add-in 18 of FIG. 1), to determine an authentication mechanism used by the web service. The web service provides functionality for facilitating access to server-side data. Note that the term "authentication mechanism" may include or be described by, for example, authentication method type, parameters and protocols used, information about any requisite identity service providers, UI display screens used to collect authentication credentials, and so on.

Next, a mechanism-using step 174 includes using the authentication mechanism or method to automatically activate (i.e., display) a UI display screen (e.g., exemplified by the dialog box 140 of FIG. 3) that includes one or more UI controls for obtaining authentication credentials in accordance with the authentication mechanism, wherein one or more features of the UI display screen may vary depending up on the type of authentication mechanism and associated method.

Subsequently, a credentials-retrieving step 176 includes using the UI display screen to retrieve login credentials, also called authentication credentials herein.

Next, a credentials-using step 178 includes using the authentication credentials to facilitate authentication of the plugin to enable the plugin to access the cloud-based data, e.g., via one or more web services or APIs (e.g., corresponding to the web services or APIs 26 of FIG. 1).

The third example method 170 may be modified, without departing from the scope of the present teachings. For example, the third example method 170 may further specify that the initial communicating step 172 includes interrogating the web service. The interrogation may include sending one or more request messages to the web service for metadata describing the authentication mechanism used by the web service.

The interrogating may further include determining the web service authentication mechanism (and associated properties, e.g., type, parameters, protocols, other requirements, etc.) by selectively testing the web service via specifically tailored messages when the web service authentication metadata does not precisely describe the authentication mechanism and any requisite parameters used by the web service.

In specific scenarios, the interrogating may facilitate determining, for example, that the web service authentication mechanism supports JWT relay authentication; supports BASIC authentication; supports multi-factor authentication; supports biometric authentication; federated authentication, and/or other type of authentication mechanism and/or method.

Figure 6:
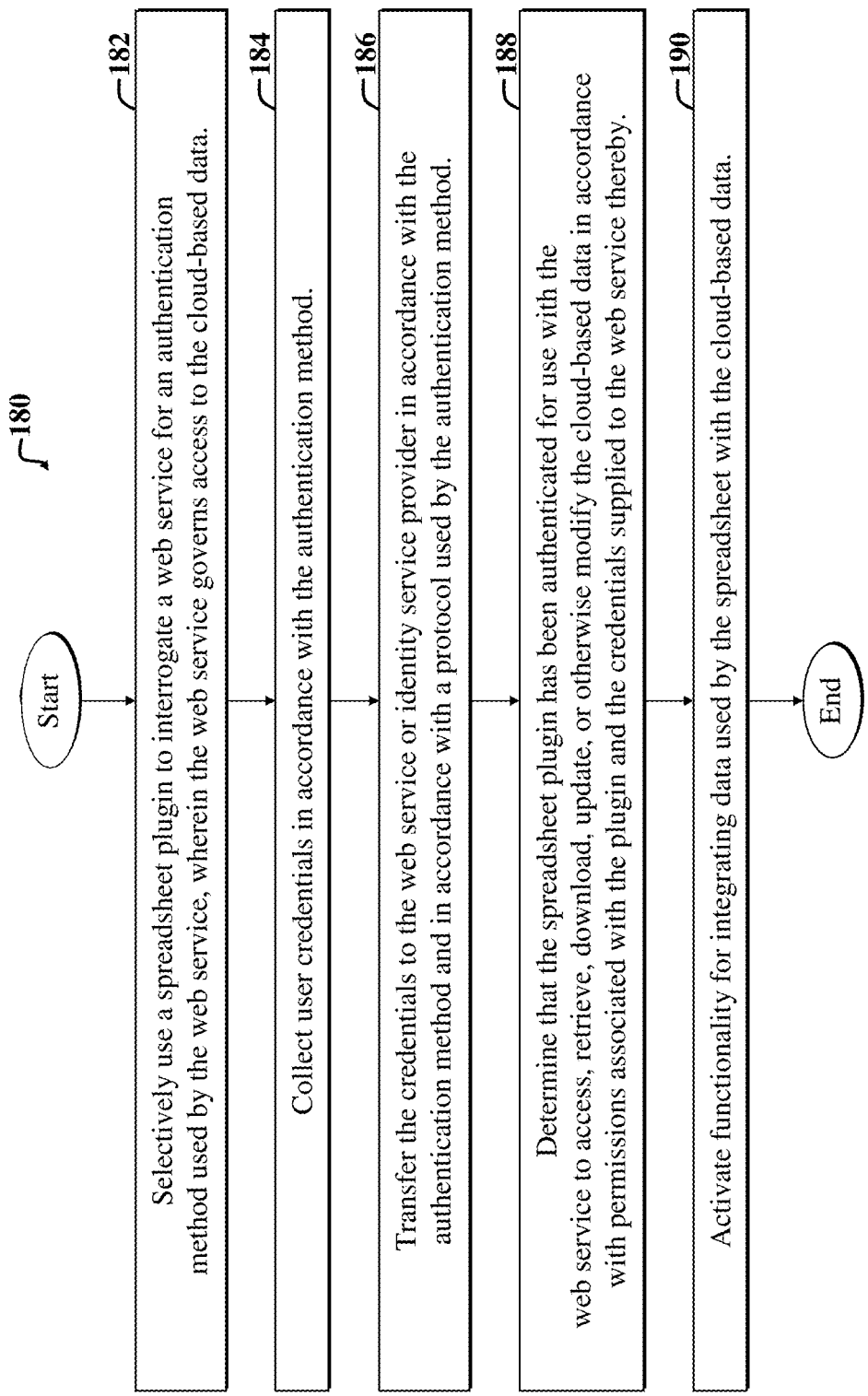
FIG. 6 is a flow diagram of a fourth example method that is suitable for use with the embodiments of FIGS. 1-5.

FIG. 6 is a flow diagram of a fourth example method 180 that is suitable for use with the embodiments of FIGS. 1-5. The fourth example method 180 facilitates authentication of a spreadsheet (e.g., corresponding to the client-side program 16 of FIG. 1) for access to cloud-based data (e.g., server-side data fronted by one or more of the web services or APIs 26 of FIG. 1).

The fourth example method 180 includes a first step 182, which involves selectively using a spreadsheet plugin to interrogate a web service for information (e.g., metadata) about an authentication method used by the web service. The web service governs access to the cloud-based data, i.e., acts as a front end, interface, or portal through which access to the cloud-based data is achieved by client-side programs attempting to interact with or integrate with the could-based data.

A second step 184 includes collecting user credentials using a method that is consistent with characteristics of the authentication method as determined through the first step 182.

A third step 186 includes transferring the credentials to the web service or identity service provider in accordance with the authentication method and in accordance with a protocol used by the authentication method.

A fourth step 188 includes determining that the spreadsheet plugin has been authenticated for use with the web service to access, retrieve, download, update, or modify the cloud-based data in accordance with permissions associated with the plugin and the credentials supplied to the web service thereby.

In response to determining that the spreadsheet plugin has been authenticated for use with the web service, a fifth step 190 then activates functionality for integrating data used by the spreadsheet with the cloud-based data.

The fourth example method 180 may be modified, without departing from the scope of the present teachings. For example, the fourth example method 180 may further specify that first step 182 includes interrogating a REST service endpoint for common authentication schemes or methods; then adapting based on any identified scheme, where the adapting includes causing display of appropriate dialog boxes to obtain authentication credentials as needed by the identified authentication scheme, and so on.

Another example method for facilitating authentication of a client-side program to enable the client-side program to interact with cloud-based data includes: interrogating a web service, using a plugin to a client-side program, to determine an authentication method used by the web service, wherein the web service implements functionality for enabling access to the cloud-based data by the client-side plugin; automatically adapting the plugin to accommodate and use the authentication method determined based on metadata or test results retrieved by the plugin in response to the interrogating, wherein the client-side program includes a spreadsheet, and wherein the plugin includes an add-in to the spreadsheet; and using the authentication method to authenticate the client-side program for use in selectively retrieving, modifying, updating, and/or deleting the cloud-based data in accordance with one or more permissions associated with credentials used to authenticate the client-side program.

Figure 7:
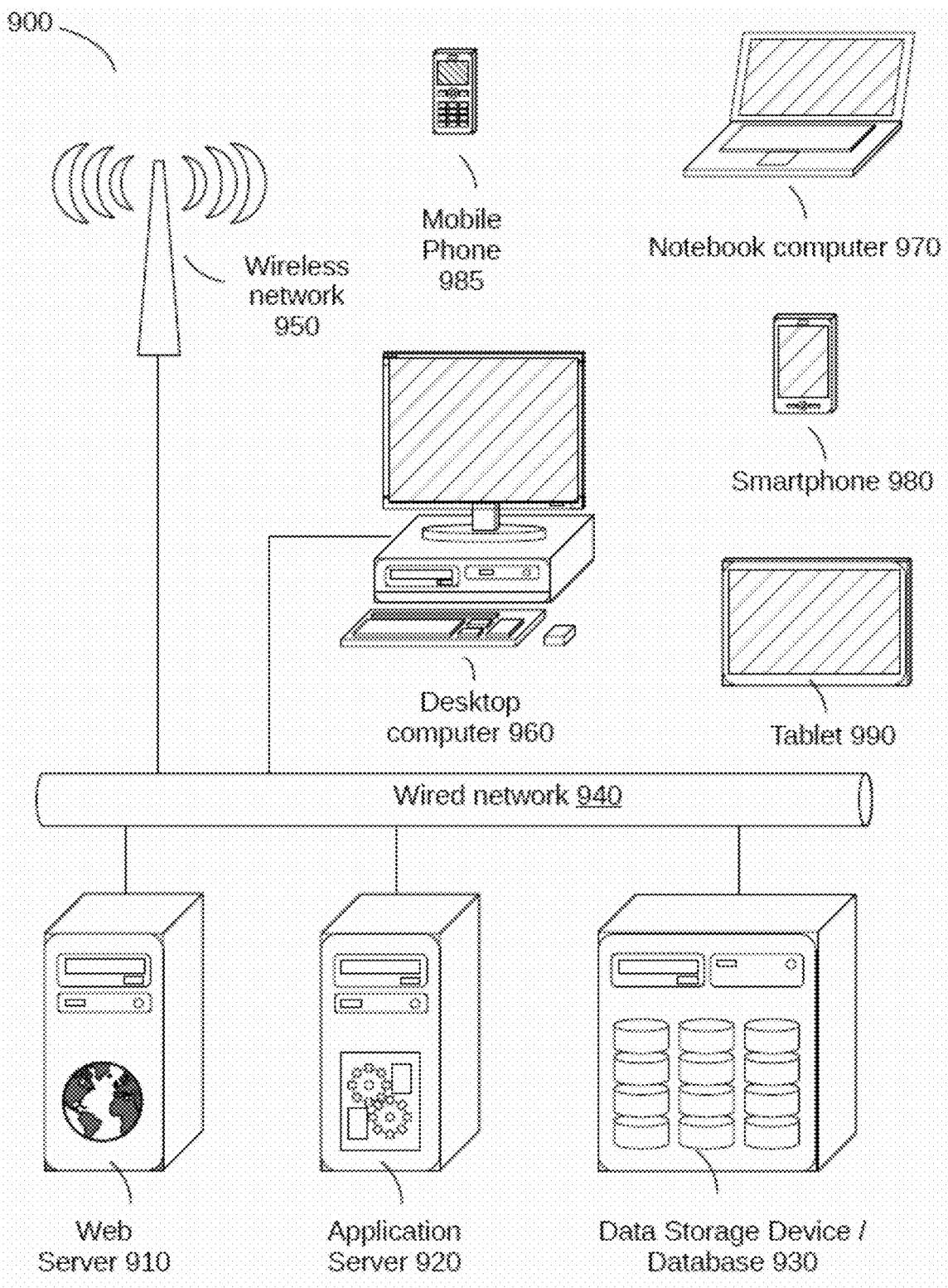
FIG. 7 is a general block diagram of a system and accompanying computing environment usable to implement the embodiments of FIGS. 1-6.

FIG. 7 is a general block diagram of a system 900 and accompanying computing environment usable to implement the embodiments of FIGS. 1-6. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 7, the client system(s) 12 of FIG. 1 may be implemented via one or more of the desktop computer 960, tablet 990, smartphone 980, notebook computer 970, and/or mobile phone 985 of FIG. 7. The server system 14 of FIG. 1 may be implemented via the web server 910 and/or application server 920 of FIG. 7.

In one example scenario, the web services or APIs 26 of FIG. 1 run on an application server (e.g., the application server 920 of FIG. 7), but are accessible (to users and client-side software) via webpage code of a website hosted by the web server 910 of FIG. 7. The web services or APIs 26 of FIG. 1 that run on the application server 920 of FIG. 7 may enable access to and use of data and functionality maintained via the data storage device of FIG. 7. The data storage device of FIG. 7 may store so-called cloud-based data and may include backend databases accessible via software running on the application server 920.

Figure 8:
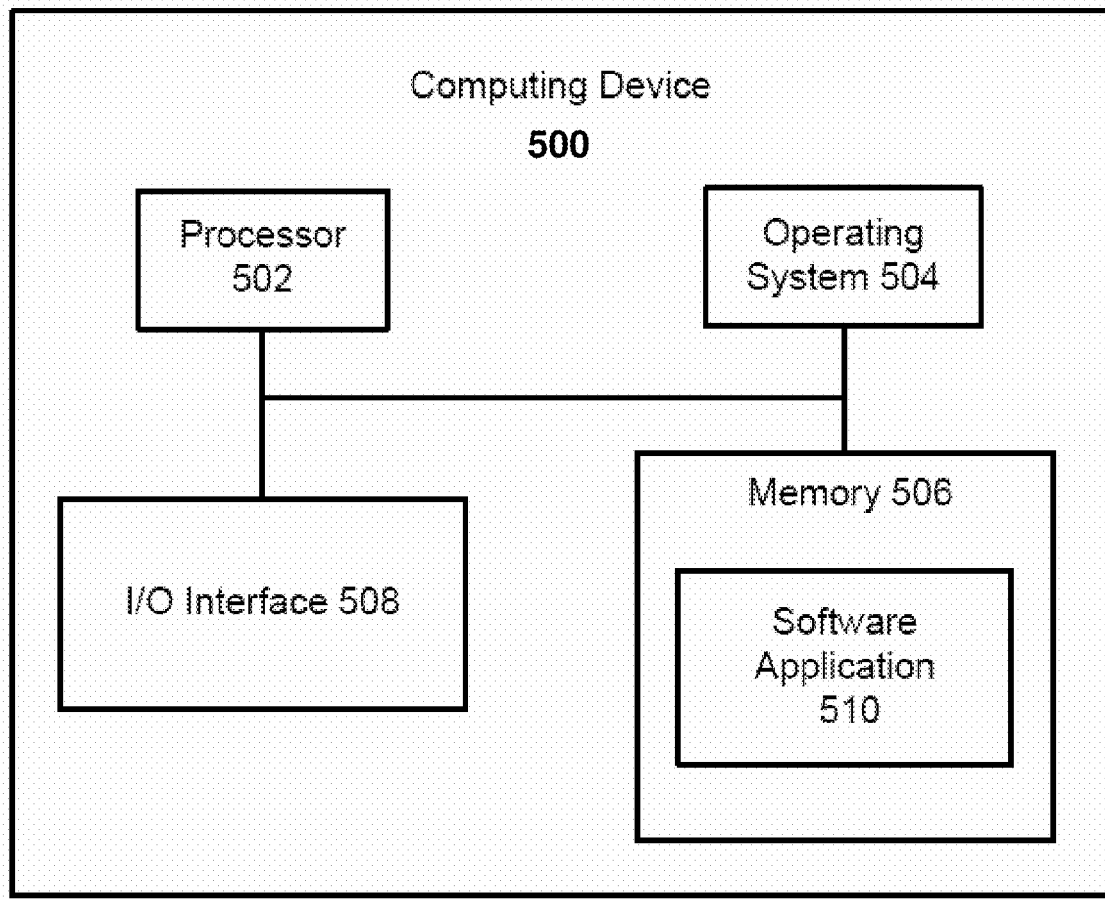
FIG. 8 is a general block diagram of a computing device usable to implement the embodiments of FIGS. 1-7.

FIG. 8 is a general block diagram of a computing device usable to implement the embodiments of FIGS. 1-7. While device 500 of FIG. 8 is described as facilitating performing the steps as described in certain implementations herein, any suitable component or combination of components of device 500 or any suitable processor or processors associated with device 500 may be used for performing the steps described.

FIG. 8 illustrates a block diagram of an example computing device 500, which may be used for implementations described herein. For example, computing device 500 may be used to implement servers 910, 920 of FIG. 7 as well as to perform the method implementations described herein. In some implementations, computing device 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of device 500 or any suitable processor or processors associated with device 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing device 500 may be implemented by one or more processors or any combination of hardware devices, as well as any combination of hardware, software, firmware, etc.

For ease of illustration, FIG. 8 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing device 500 may not have all of the components shown and/or may have other elements including other types of components instead of, or in addition to, those shown herein.

Although the description has been described with respect to particular embodiments thereof, these particular embodiments are merely illustrative, and not restrictive. For example, while embodiments are primarily discussed as usable with client-side spreadsheets to facilitate access to and updating of data and/or functionality provided by a web service, embodiments are not limited thereto. Features described herein may be used with other types of client-side software, such as data visualization software, relational databases, and so on, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

It will also be appreciated that any of the methods described above can be performed by an apparatus comprising one or more means. For example, an apparatus may be provided for facilitating communications between a client-side program and server-side software. The apparatus may comprise: means for receiving a signal from a client-side program to communicate with server-side software; means for interrogating the server-side software for authentication-method information; means for using the authentication-method information to authenticate the client-side program for interaction with the server-side software; and means for enabling communications between the client-side program and the server-side software using an authentication method specified by the authentication-method information. Other steps in the methods described above can also be performed by one or more means in the apparatus. Here, the apparatus may be implemented as software, such as the add-in 18 in FIG. 1, and the means may be implemented as program modules in the software.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable medium including instructions executable by one or more processors, and when executed operable for:

receiving a first user selection of a first user interface control of a first client-side program on a client device for initiating download of first cloud-based data, from a first server-side software, for use in the first client-side program, wherein the download requires authentication of the first client-side program and the first client-side program is unauthenticated for initiating the download first;

receiving a signal from the first client-side program to communicate with the first server-side software;

interrogating the first server-side software for first authentication-method information that includes a first type-of-authentication of a first authentication method in use by the first server-side software;

obviating manual configuration of parameters governing the first authentication method by automatically configuring the first authentication method based on the first authentication-method information;

using the first authentication method to authenticate the first client-side program for interaction with the first server-side software;

enabling first communications between the first client-side program and the first server-side software using the first authentication method specified by the first authentication-method information;

downloading the first cloud-based data from the first server-side software to the first client-side program that has been authenticated for the first communications;

detecting second user selection of second user interface control for second client-side program on the client device for initiating download of second cloud-based data, from a second server-side software for use in the second client-side program;

interrogating the second server-side software for second authentication-method information that includes a second type-of-authentication of a second authentication method in use by the second server-side software;

automatically configuring the second authentication method based on the second authentication-method information; and downloading the second cloud-based data from the second server-side software to the second client-side program that has been authenticated for the second communications.

2. The non-transitory processor-readable medium of claim 1, wherein the first server-side software includes a REpresentational State Transfer (REST) web service.

3. The non-transitory processor-readable medium of claim 2, wherein the first client-side program includes a spreadsheet program.

4. The non-transitory processor-readable medium of claim 3, wherein the first client-side program includes Microsoft Excel®.

5. The non-transitory processor-readable medium of claim 1, wherein steps of claim 1 are implemented using an add-in to the first client-side program.

6. The non-transitory processor-readable medium of claim 1, wherein the first authentication method includes use of a JSON Web Token (JWT).

7. The non-transitory processor-readable medium of claim 1, wherein the first authentication method includes basic access authentication (BASIC).

8. The non-transitory processor-readable medium of claim 1, further including instructions executable by the one or more processors and when executed operable for selecting a User Interface (UI) display screen in accordance with the first authentication method.

9. The non-transitory processor-readable medium of claim 8, further including instructions executable by the one or more processors and when executed operable for using the UI display screen to collect one or more credentials from a user.

10. The non-transitory processor-readable medium of claim 9, further including instructions executable by the one or more processors and when executed operable for employing the credentials to facilitate authenticating the user and the first client-side program for access to the first cloud-based data via the first server-side software.

11. A method for facilitating communications between a client-side program and server-side software, the method comprising:

receiving a first user selection of a first user interface control of a first client-side program on a client device for initiating download of first cloud-based data, from a first server-side software, for use in the first client-side program, wherein the download requires authentication of the first client-side program and the first client-side program is unauthenticated for initiating the download first;

receiving a signal from the first client-side program to communicate with the first server-side software;

interrogating the first server-side software for first authentication-method information that includes a first type-of-authentication of a first authentication method in use by the first server-side software;

obviating manual configuration of parameters governing the first authentication method by automatically configuring the first authentication method based on the first authentication-method information;

using the first authentication method to authenticate the first client-side program for interaction with the first server-side software;

enabling first communications between the first client-side program and the first server-side software using the first authentication method specified by the first authentication-method information;

downloading the first cloud-based data from the first server-side software to the first client-side program that has been authenticated for the first communications;

detecting second user selection of second user interface control for second client-side program on the client device for initiating download of second cloud-based data, from a second server-side software for use in the second client-side program;

interrogating the second server-side software for second authentication-method information that includes a second type-of-authentication of a second authentication method in use by the second server-side software;

automatically configuring the second authentication method based on the second authentication-method information; and downloading the second cloud-based data from the second server-side software to the second client-side program that has been authenticated for the second communications.

12. The method of claim 11, wherein the first server-side software includes a REpresentational State Transfer (REST) web service.

13. The method of claim 12, wherein the first client-side program includes a spreadsheet program.

14. The method of claim 13, wherein the first client-side program includes Microsoft Excel®.

15. The method of claim 11, wherein steps of claim 11, are implemented using an add-in to the first client-side program.

16. The method of claim 11, wherein the first authentication method includes use of a JSON Web Token (JWT).

17. The method of claim 11, wherein the first authentication method includes basic access authentication (BASIC).

18. The method of claim 11, further including selecting a User Interface (UI) display screen in accordance with the first authentication method.

19. The method of claim 18, further including:

using the UI display screen to collect one or more credentials from a user; and employing the credentials to facilitate authenticating the user and the first client-side program for access to the first cloud-based data via the first server-side software.

20. An apparatus comprising:

one or more hardware processors; and logic encoded in one or more non-transitory media for execution by the one or more processors and when executed operable for:

receiving a first user selection of a first user interface control of a first client-side program on a client device for initiating download of first cloud-based data, from a first server-side software, for use in the first client-side program, wherein the download requires authentication of the first client-side program and the first client-side program is unauthenticated for initiating the download first;

receiving a signal from the first client-side program to communicate with the first server-side software;

interrogating the first server-side software for first authentication-method information that includes a first type-of-authentication of a first authentication method in use by the first server-side software;

obviating manual configuration of parameters governing the first authentication method by automatically configuring the first authentication method based on the first authentication-method information;

using the first authentication method to authenticate the first client-side program for interaction with the first server-side software;

enabling first communications between the first client-side program and the first server-side software using the first authentication method specified by the first authentication-method information;

downloading the first cloud-based data from the first server-side software to the first client-side program that has been authenticated for the first communications;

detecting second user selection of second user interface control for second client-side program on the client device for initiating download of second cloud-based data, from a second server-side software for use in the second client-side program;

interrogating the second server-side software for second authentication-method information that includes a second type-of-authentication of a second authentication method in use by the second server-side software;

automatically configuring the second authentication method based on the second authentication-method information; and downloading the second cloud-based data from the second server-side software to the second client-side program that has been authenticated for the second communications.

21. The apparatus of claim 20, wherein the logic is further operable for selecting a User Interface (UI) display screen in accordance with the first authentication method.

22. The apparatus of claim 21, wherein the logic is further operable for using the UI display screen to collect one or more credentials from a user.

23. The apparatus of claim 22, wherein the logic is further operable for employing the credentials to facilitate authenticating the user and the first client-side program for access to the first cloud-based data via the first server-side software.

24. An apparatus for facilitating communications between a client-side program and server-side software, the apparatus comprising:

means for receiving a first user selection of a first user interface control of a first client-side program on a client device for initiating download of first cloud-based data, from a first server-side software, for use in the first client-side program, wherein the download requires authentication of the first client-side program and the first client-side program is unauthenticated for initiating the download first;

means for receiving a signal from the first client-side program to communicate with the first server-side software;

means for interrogating the first server-side software for first authentication-method information that includes a first type-of-authentication of a first authentication method in use by the first server-side software;

means for obviating manual configuration of parameters governing the first authentication method by automatically configuring the first authentication method based on the first authentication-method information;

means for using the first authentication method to authenticate the first client-side program for interaction with the first server-side software;

means for enabling first communications between the first client-side program and the first server-side software using the first authentication method specified by the first authentication-method information;

means for downloading the first cloud-based data from the first server-side software to the first client-side program that has been authenticated for the first communications;

means for detecting second user selection of second user interface control for second client-side program on the client device for initiating download of second cloud-based data, from a second server-side software for use in the second client-side program;

means for interrogating the second server-side software for second authentication-method information that includes a second type-of-authentication of a second authentication method in use by the second server-side software;

means for automatically configuring the second authentication method based on the second authentication-method information; and means for downloading the second cloud-based data from the second server-side software to the second client-side program that has been authenticated for the second communications.

25. The apparatus of claim 24, further comprising means for selecting a User Interface (UI) display screen in accordance with the first authentication method.

26. The method of claim 25, further comprising means for using the UI display screen to collect one or more credentials from a user.

27. The method of claim 26, further comprising means for employing the credentials to facilitate authenticating the user and the first client-side program for access to the first cloud-based data via the first server-side software.

* * * * *

UNITED STATES PATENT AND TRADEMARK OFFICE
CERTIFICATE OF CORRECTION

| | | |
|---|---|---|
| PATENT NO. | : 11,822,637 B2 | Page 1 of 1 |
| APPLICATION NO. | : 16/560201 | |
| DATED | : November 21, 2023 | |
| INVENTOR(S) | : Davis et al. | |

It is certified that error appears in the above-identified patent and that said Letters Patent is hereby corrected as shown below:

In the Specification

In Column 4, Line 55, delete "(APIs)" and insert -- (APIs). --, therefor.

In the Claims

In Column 20, Line 29, in Claim 15, delete "11," and insert -- 11 --, therefor.

Signed and Sealed this
Fifth Day of November, 2024

Katherine Kelly Vidal
*Director of the United States Patent and Trademark Office*